(12) United States Patent
Cantin et al.

(10) Patent No.: US 11,377,224 B2
(45) Date of Patent: Jul. 5, 2022

(54) SYSTEM COMPRISING AN AIR INTAKE OF AN AIRCRAFT ENGINE AND AN INFLATABLE PROTECTION ITEM FOR SAID AIR INTAKE

(71) Applicant: Airbus Operations SAS, Toulouse (FR)

(72) Inventors: Jean-Marc Cantin, Cheix en Retz (FR); Olivier Dubois, Le Bignon (FR)

(73) Assignee: Airbus Operations SAS, Toulouse (FR)

( * ) Notice: Subject to any disclaimer, the term of this patent is extended or adjusted under 35 U.S.C. 154(b) by 212 days.

(21) Appl. No.: 16/778,950

(22) Filed: Jan. 31, 2020

(65) Prior Publication Data

US 2020/0262572 A1 Aug. 20, 2020

(30) Foreign Application Priority Data

Feb. 20, 2019 (FR) ...................................... 1901676

(51) Int. Cl.
*B64D 33/02* (2006.01)
*B64F 5/10* (2017.01)

(52) U.S. Cl.
CPC ................ *B64D 33/02* (2013.01); *B64F 5/10* (2017.01)

(58) Field of Classification Search
CPC ..... B64F 5/50; B65D 81/052; B65D 71/0096; B60P 7/065; B60J 11/06
See application file for complete search history.

(56) References Cited

U.S. PATENT DOCUMENTS

| | | | | |
|---|---|---|---|---|
| 2,449,591 A | * | 9/1948 | Couse | B65D 81/052 206/522 |
| 3,022,896 A | * | 2/1962 | Dew | B65D 81/052 211/85.8 |
| 3,612,484 A | * | 10/1971 | Gallagher | B64F 5/50 414/458 |
| 3,934,919 A | * | 1/1976 | Smith | B66C 1/18 294/74 |

(Continued)

FOREIGN PATENT DOCUMENTS

| | | | | |
|---|---|---|---|---|
| CN | 107097948 A | | 8/2017 | |
| FR | 2805244 A1 | * | 8/2001 | ................ B66F 3/35 |

(Continued)

OTHER PUBLICATIONS

Machine Translation of FR2805244A1 (Year: 2001).*
(Continued)

*Primary Examiner* — Jacob J Cigna
*Assistant Examiner* — Michael W Hotchkiss
(74) *Attorney, Agent, or Firm* — Greer, Burns & Crain, Ltd.

(57) ABSTRACT

A system comprising a trolley which comprises a platform and wheels attached beneath the platform, an air intake of an aircraft engine, where the air intake rests on the platform so as to have its narrowest part at the top and its widest part at the bottom, and an inflatable protection item in the form of a closed envelope which is placed around the widest part of the air intake. A system of this kind makes it possible to protect the air intake from collisions that it might experience during movement of the trolley, and to increase safety by avoiding collisions between operators and the air intake.

6 Claims, 1 Drawing Sheet

(56) References Cited

U.S. PATENT DOCUMENTS

| | | | | |
|---|---|---|---|---|
| 4,876,841 A * | 10/1989 | Jensen | ............... | B65D 71/0096 |
| | | | | 53/399 |
| 5,042,663 A * | 8/1991 | Heinrich | ............. | B65D 81/052 |
| | | | | 206/522 |
| 5,351,829 A * | 10/1994 | Batsford | ............. | B65D 81/052 |
| | | | | 206/522 |
| 5,579,698 A * | 12/1996 | Lis | ........................... | B61D 3/16 |
| | | | | 105/176 |
| 5,890,525 A * | 4/1999 | Shores | ..................... | B60J 11/00 |
| | | | | 150/166 |
| 6,099,221 A * | 8/2000 | Takagi | ................... | B65D 63/10 |
| | | | | 410/97 |
| 6,606,826 B2 | 8/2003 | Nagle | | |
| 7,410,057 B2 * | 8/2008 | Yoshifusa | ............ | B65D 81/075 |
| | | | | 206/522 |
| 9,162,805 B1 * | 10/2015 | Testa | ..................... | B65D 71/02 |
| 9,446,857 B2 * | 9/2016 | Sparks | .................... | B64F 1/005 |
| 9,970,326 B2 * | 5/2018 | Roberts | ................ | F01D 25/285 |
| 10,427,855 B2 * | 10/2019 | Barnitz | ............... | B65D 81/052 |
| 10,882,439 B2 * | 1/2021 | Enyeart | ..................... | B60P 7/08 |
| 2003/0206782 A1 * | 11/2003 | Toglia | .................. | B60P 7/0884 |
| | | | | 410/94 |
| 2004/0149618 A1 * | 8/2004 | Otaki | ................... | B65D 81/052 |
| | | | | 206/521 |
| 2005/0006271 A1 * | 1/2005 | Nakagawa | ........... | B65D 81/052 |
| | | | | 206/521 |
| 2007/0003170 A1 * | 1/2007 | Yoshida | ............... | B65D 81/075 |
| | | | | 383/3 |
| 2007/0199854 A1 * | 8/2007 | Sadow | .................... | A45C 13/02 |
| | | | | 206/522 |
| 2007/0210569 A1 * | 9/2007 | Anderson | ............. | B60P 7/0823 |
| | | | | 280/758 |
| 2016/0251155 A1 * | 9/2016 | Lato | ...................... | B60P 7/0876 |
| | | | | 410/98 |
| 2017/0297744 A1 | 10/2017 | Drieu et al. | | |
| 2018/0170239 A1 * | 6/2018 | Dressel | ................. | B65D 81/03 |
| 2019/0016502 A1 * | 1/2019 | Millhouse | ........... | B65D 71/0096 |
| 2019/0322391 A1 * | 10/2019 | Lamadon | ................. | B64F 5/50 |
| 2021/0179393 A1 * | 6/2021 | Boileau | .................. | B66C 1/107 |

FOREIGN PATENT DOCUMENTS

| | | | | |
|---|---|---|---|---|
| NL | 1009687 C2 * | 1/2000 | ........... | B65D 81/052 |
| RU | 183207 U1 * | 9/2018 | ................ | B64F 1/32 |

OTHER PUBLICATIONS

Machine Translation of NL1009687C2 (Year: 2000).*
Machine Translation of RU183207U1 (Year: 2018).*
French Search Report; priority document.

* cited by examiner

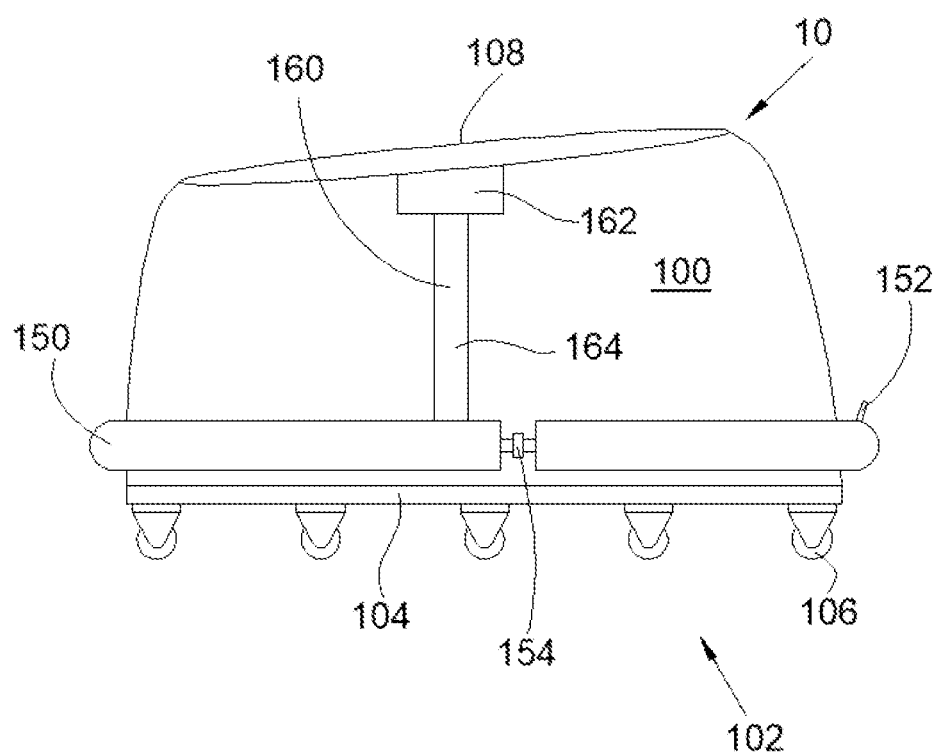

SYSTEM COMPRISING AN AIR INTAKE OF AN AIRCRAFT ENGINE AND AN INFLATABLE PROTECTION ITEM FOR SAID AIR INTAKE

CROSS-REFERENCES TO RELATED APPLICATIONS

This application claims the benefit of the French patent application No. 1901676 filed on Feb. 20, 2019, the entire disclosures of which are incorporated herein by way of reference.

FIELD OF THE INVENTION

The present invention relates to a system comprising an air intake of an aircraft engine and an inflatable protection item for the air intake.

BACKGROUND OF THE INVENTION

During the production of an air intake for an aircraft engine, this air intake is placed on a trolley which serves for moving the air intake from one assembly station to another. Moreover, the trolleys also serve for moving and storing the air intakes in a storage area between two assembly stations or prior to mounting on the engine of the aircraft.

An air intake of this kind mounted in this manner on a trolley is moved regularly and, owing to its lateral size, may, during a maneuver, collide with another air intake mounted in this manner on another trolley or an element of the surroundings (barrier etc.), which can damage the air intake.

SUMMARY OF THE INVENTION

The present invention has an object of proposing a system comprising an air intake of an aircraft engine and an inflatable protection item for the air intake, where the inflatable protection item protects the air intake when it is mounted on the trolley and collides with an external element.

To that end, there is proposed a system comprising:
a trolley comprising a platform and wheels attached beneath the platform,
an air intake of an aircraft engine, where the air intake rests on the platform so as to have its narrowest part at the top and its widest part at the bottom, and
an inflatable protection item in the form of a closed envelope which is placed around the widest part of the air intake.

A system of this kind makes it possible to protect the air intake from collisions that it might experience during movement of the trolley, and to increase safety by avoiding collisions between operators and the air intake.

According to another particular embodiment, the envelope is in the form of a sausage of flexible material, the two ends of which are attached to one another by an attachment element.

Advantageously, the system comprises a strip placed against an outer face of the air intake and comprising an outward-oriented face, in that the face has removable attachment features, and in that at least one of the ends of the sausage has a complementary element for attachment to the strip.

According to one particular embodiment, the envelope is in the form of a torus of flexible material.

Advantageously, the inflatable protection item has an inflation valve which is arranged on the outer surface of the inflatable protection item.

BRIEF DESCRIPTION OF THE DRAWINGS

The above-mentioned features of the invention, along with others, will become more clearly apparent on reading the following description of one exemplary embodiment, the description being given with reference to the appended drawing, in which:

The FIGURE is a side view of a system according to the invention comprising an air intake and an inflatable protection item.

DETAILED DESCRIPTION OF THE PREFERRED EMBODIMENTS

In the following description, terms relating to a position are provided in relation to an air intake 100 as shown in the FIGURE.

The FIGURE shows a system 10 comprising a trolley 102 and an air intake 100 of an aircraft engine where the air intake 100 is placed on the trolley 102.

The trolley 102 comprises a platform 104 and wheels 106 attached beneath the platform 104. The trolley 102 can consist of multiple juxtaposed panels on casters.

The air intake 100 rests on the platform 104 such that its leading edge 108 is oriented upwards. The narrowest part of the air intake 100, which corresponds to the leading edge 108, is thus located at the top, and the widest part, which is at the opposite end, is located at the bottom and thus on the platform 104.

The air intake 100 wears an inflatable protection item 150 which is placed around the lower part of the air intake 100, that is to say, the widest part which rests on the platform 104.

The inflatable protection item 150 is an envelope which is closed such that it can be pressurized.

An inflatable protection item 150 of this kind can thus be put in place quickly and easily via the top of the air intake 100, that is to say, the narrowest part, and lowered along the vertical flanks of the air intake 100 so as to be installed around the lower part. An inflatable protection item 150 of this kind makes it possible to protect the air intake 100 from collisions that it might experience during movement of the trolley 102, and to increase safety by avoiding collisions between operators and the air intake 100.

According to the embodiment of the invention shown in FIG. 1, the envelope is in the form of a sausage of flexible material, such as rubber, the two ends of which are attached to one another by an attachment element 154, such as removable attachments, for example, a clasp, thus forming a torus. The attachment element 154 may be adjustable in length so as to adapt to the perimeter of the air intake 100.

According to another embodiment, the envelope is in the form of a torus of flexible material, such as rubber.

The internal diameter of the torus is smaller than the largest outer diameter of the air intake 100, that is to say, of the lower part, in order to ensure that the inflatable protection item 150 is held in position.

The inflatable protection item 150 has an inflation valve 152 which is arranged on the outer surface of the inflatable protection item 150, that is to say, the surface which remains accessible when the inflatable protection item 150 is in place on the air intake 100.

The inflatable protection item 150 may have another valve that is intended for receiving a manometer which serves for checking the inflation pressure.

To facilitate the placement of the inflatable protection item 150, the system 10 comprises a strip 160 placed against the outer face of the air intake 100 and comprising a face 164 oriented away from the air intake 100, that is to say, outwardly, where the face 164 has removable attachment features, that is to say, it allows an element to be attached while permitting subsequent removal of the element without damaging the element or the strip 160. The face 164 may, for example, be a Velcro® (hook and loop) strip.

In this case, the strip 160 is put in place and held by means of a saddle 162 which straddles the leading edge of the air intake 100 and to which the strip 160 is attached.

At least one of the ends of the sausage 150 has a complementary element for attachment to the strip 160, that is to say, the end can be removably attached to the strip 160. Thus, an operator can put the strip 160 in place, attach the first end of the sausage to the strip 160 by means of the complementary attachment element, encircle the air intake 100 with the second end of the sausage until meeting the first end, and attach the two ends, brought together in this manner, using the attachment element 154.

During inflation, the inflation valve 152 may be connected to an air source using a compressed air gun and/or a nozzle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system comprising: a trolley comprising a horizontal platform and wheels attached beneath the horizontal platform, an air intake of an aircraft engine, where the air intake rests horizontally on the horizontal platform so as to have a narrowest part of the air intake oriented upwardly and at least two opposite ends of a widest part of the air intake oriented downwardly and resting on the horizontal platform, and an inflatable protection item formed as a closed envelope which is placed around the widest part of the air intake, two ends of the closed envelope being attached to one another by an attachment element that is adjustable in length.

2. The system according to claim 1, wherein the envelope is formed as a torus of flexible material.

3. The system according claim 1, wherein the inflatable protection item has an inflation valve which is arranged on an outer surface of the inflatable protection item.

4. The system of claim 1, wherein the attachment element comprises a clasp.

5. The system according to claim 1, wherein the envelope is formed as a sausage of flexible material.

6. The system according to claim 5, further comprising a strip placed against an outer face of the air intake and comprising an outward-oriented face, wherein said outward-oriented face has removable attachment features, and wherein at least one end of the envelope has a complementary element for attachment to the strip.

* * * * *